June 3, 1958 H. MOHN 2,837,469
DISTILLING APPARATUS FOR THE PRODUCTION OF PURE WATER
Filed May 18, 1955
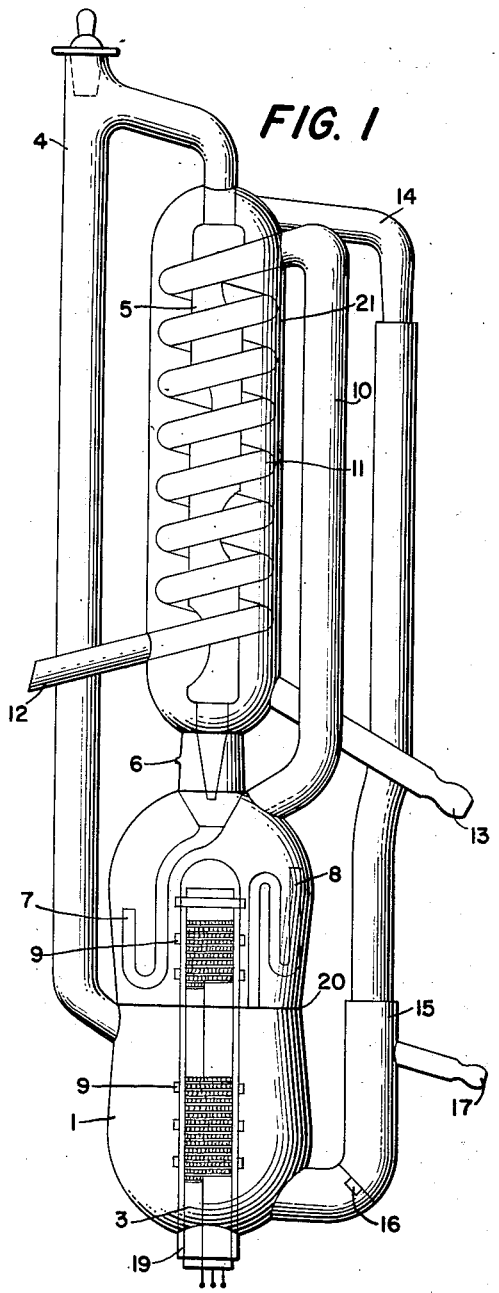
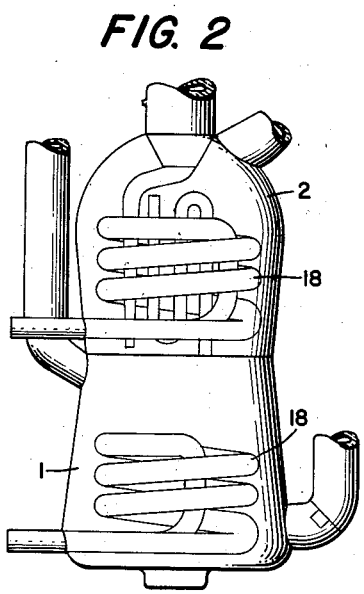
INVENTOR
HEINRICH MOHN
BY
ATTORNEYS United States Patent Office 2,837,469
Patented June 3, 1958

2,837,469

DISTILLING APPARATUS FOR THE PRODUCTION OF PURE WATER

Heinrich Mohn, Hailer, Germany, assignor to W. C. Heraeus G. m. b. H., Hanau (Main), Germany, a German body corporate Application May 18, 1955, Serial No. 509,323
In Germany October 7, 1949

Public Law 619, August 23, 1954
Patent expires October 7, 1969

9 Claims. (Cl. 202—73)

This invention relates to a distilling apparatus for the production of pure water.

When repeated distillations are required for the production of pure substances, there is always the risk when introducing the first distillate into a second distilling operation, that impurities may enter the liquid, and gaseous or finely distributed substances may be taken up from the air. In addition repeated distillations have the drawback that they require a considerable expenditure of heat.

It is an object of the present invention to develop an apparatus for the production of pure water by repeated distillation, which provides particular protection against the entry of impurities and which at the same time operates more favourably from the point of view of heat economy than the hitherto known apparatus.

In order that the invention may be more readily understood, two embodiments of a distilling apparatus for the preparation of pure water according to the invention are respectively shown in Figures 1 and 2 of the accompanying drawing, the details of which will be explained further below after explanation of the essential feaures of the present invention.

According to the invention two distilling flasks made of quartz glass or of glass of high silicic acid content are arranged directly above each other, separated only by a single partition. The two distilling flasks operate simultaneously and continuously, the distillate from the lower flask being fed to and redistilled in the upper flask, precautions being taken to prevent the condensate entering the upper flask from contaminating the vapour of the upper vessel and conversely to prevent the vapours of the upper flask from returning to the cooler of the first distillation stage. This is achieved in an extremely simple manner by a tube curved in U-formation through which the liquid enters from the first distillation stage into the second flask.

The distilling flasks are made from silicon dioxide, that is to say from transparent quartz glass or from non-transparent quartz ware. This material could also be replaced by other high-melting glasses of high silicic-acid content, this term being used in the present specification in the usual manner to indicate glass having a $SiO_2$ content of more than 60% and preferably more than 75% The other parts of the distilling apparatus, especially those which participate in the responsibility of obtaining high purity of the produced water, more particularly the essential parts of the cooler, are preferably also made from the same material.

Preferably one common heating element is employed which is subdivided in two stages according to the required ratio for the two distilling flasks. For example a heating cartridge may be provided which is arranged in the axis of the twin vessel, and the windings of which are distributed between the two vessels in accordance with the required heat consumption.

Instead of providing a heating cartridge, one may alternatively provide in the twin vessel, for example, a coil of quartz glass or quartz ware, carrying in its interior a resistance wire.

If desired one single heating stage may also be employed for the two distilling flasks, this heating stage being so arranged that its output is distributed to the two flasks according to the requirements. Two-stage heating has the advantage that it makes it possible to switch on at first, during the starting of the distillation, only the heating stage of the lower flask.

The heating power may be distributed to the two distilling flasks in such manner that a little more is distilled into the upper vessel than is re-distilled from the latter, a device being interposed betwen the two vessels which, without affecting the quality of the already predistilled liquid in the upper flask, returns to the lower vessel any excess of distillate present in the upper vessel. This may be attained by simply providing a double-curved tube which forms a seal between the two vessels and at the same time serves as an overflow.

In order to ensure economical utilisation of the cooling water and to further simplify the arrangement, the condensation of the two distillation stages is arranged to take place in a common cooler located above the two distilling flasks, the arrangement being such that the cooling water passes at the same time in counterflow both the mutually adjacently arranged cooling paths for the two stages.

In order to ensure that in the first distillation stage the steam will not have to work against a somewhat higher pressure, a capillary is provided near the lower end of the cooling paths, which effects pressure equalisation with the atmosphere.

In order to ensure economic utilisation of the heat, the water in the lower distillation flask is, during the distillation of distilled water, replenished via an overflow by cooling water which has been preheated by the heat exchange with the two distillates, a throttle being provided for preventing any water from returning to the flask due to vapour surges and heat flow.

A pre-softening vessel may be arranged in the water supply to the lower distilling flask either at the point at which the water leaves the cooler, or preferably beyond the overflow so as to soften only that part of the water which is required for the distilling flask.

Referring now to the drawing, in which two embodiments of the water distilling apparatus according to the invention are illustrated by way of non-limitative examples, Fig. 1 shows an arrangement in which a heating cartridge 3 is arranged to extend axially through the two distilling flasks 1 and 2 which are arranged above each other, being only separated by a partition 20. In the first distilling stage steam is produced in the lower flask 1 and is conducted through a tube 4 to a cooling passage 5, which near its lower end is provided with a capillary 6 for pressure equalisation with the atmosphere. The condensate will collect at the lower end of the cooling passage 5 and is conducted through a U-shaped tube 7, which acts as seal, into the upper distilling flask 2, any excess distillate in the flask 2 being returned to the flask 1 through the overflow-type control device 8. Small quartz crocks or rings 9 are fused to the outer surface of the quartz housing 19 of the heating cartridge 3 which is arranged axially in the two distilling flasks 1 and 2 and serve to prevent any boiling delay. The distillate of the second distilling flask 2 is conducted through a tube 10 into a second cooling passage 11 and a tube 12 is connected to the lower end of the tube 11, so that bidistilled water can be taken off at the end of tube 12.

The two cooling passages 5 and 11 are accommodated in a common tubular cooler 21 to which cooling water is supplied through a stud connection 13 while the used cooling water leaves the cooler through a tube 14, whence, via an overflow control device 15 and a throttle device 16, it reaches the lower distilling flask 1, any excess water escaping through a tube 17.

Fig. 2 illustrates a modification of the heating arrangement and shows a two-stage heating device comprising two quartz ware coils 18, one in each of the distilling flasks 1 and 2, each coil being provided with a resistance wire. These coils perform the function which is performed by the heating cartridge 3 in the embodiment Fig. 1.

It will be readily understood from the foregoing description that the invention makes possible a very compact arrangement, in which the heat is utilised in a most favourable manner. Apart from the fact that water which has been preheated by being used as cooling water for the two distilling operations is supplied to the first distilling flask, losses of heat are largely avoided by the close connection of the two distilling flasks.

It is particularly remarkable to what an extent, as compared with arrangements hitherto used in practice, the risk of contamination of the liquid during its passage from one distillation stage to the other is removed by the fact that the two distillation stages operate simultaneously and continuously in a uniform self-contained system employing particularly short paths. Thus with the use of the simplest means a water is obtained the purity of which will satisfy high requirements.

I claim:

1. Distillation apparatus for the production of pure water, comprising, in combination, two superposed distillation flasks of silicon dioxide for simultaneously and continuously operating two distillation stages, a separating wall between said flasks constituting the ceiling of the lower flask and the bottom of the upper flask, electrical heating means mounted in the two flasks, conduit means connecting the two flasks for feeding distillate from the lower to the upper flask, safety means arranged in the upper flask and forming part of said conduit means for preventing contamination of the vapor of the second distillation stage by condensate fed from the first stage through the conduit means, a common cooler of silicon dioxide for both distillation stages, said cooler being arranged in superposed relationship to the two distillation flasks and said conduit means passing through the cooler to constitute a cooling path for the first distillation stage, capillary means arranged near the lower end of said cooling path for effecting pressure equalization with the atmosphere, overflow means connecting the cooler and the lower flask for feeding water from the cooler to the lower flask, and a throttle device arranged in said overflow water feeding means.

2. The distillation apparatus of claim 1, comprising a centrally mounted tube in said flasks and said electrical heating means for both distillation stages is mounted within said tube.

3. The distillation apparatus of claim 1, wherein said safety means is a U-shaped tube constituting the feeding end of the conduit means in the upper flask.

4. The distillation apparatus of claim 1, comprising a vertically S-shaped overflow tube arranged in the upper flask and communicating with the lower flask for conducting overflow distillate from the upper flask to the lower flask.

5. Distillation apparatus for simultaneously and continuously bi-distilling water, comprising, in combination, two superposed distillation flasks of silicon dioxide, a separating wall between said flasks constituting the ceiling of the lower flask and the bottom of the upper flask, electrical heating means mounted in said flasks, a cooler of silicon dioxide arranged in superposed relationship to the two flasks, conduit means connecting the two flasks and passing through said cooler for feeding distillate from the lower to the upper flasks, a U-shaped tube constituting the feeding end of the conduit means arranged in the upper flask for preventing contamination of vapor in the upper flask by condensate fed through said conduit means, capillary means arranged near the lower end of said conduit means and before the U-shaped tube for effecting pressure equalization with the atmosphere, second conduit means leading from the upper flask through said cooler, distilled water output means attached to said second conduit means, third conduit means for delivering cooling water to said cooler, overflow conduit means connecting the cooler and the lower flask for feeding water from the cooler to the lower flask, and a throttle device arranged in said overflow water feeding means.

6. The distillation apparatus of claim 5, wherein said first-named conduit means passes centrally through said cooler and the second conduit means comprises a coil pipe mounted about said central conduit.

7. The distillation apparatus of claim 5, comprising a vertically S-shaped overflow tube arranged in the upper flask and communicating with the lower flask for conducting overflow distillate from the upper to the lower flask.

8. A process for simultaneously and continuously bi-distilling water, comprising the steps of heating water in a first distillation stage to produce a water distillate, feeding the distillate directly to a second distillation stage directly above the first distillation stage, cooling the distillate during the feeding, the cooled distillate being fed into the second distillation stage through a U-shaped path, equalizing the pressure with the atmosphere near the end of the feeding, heating the cooled distillate in the second distillation stage, delivering the distillate from the second distillation to an output, cooling the latter distillate during delivery, the first and second distillate being cooled simultaneously in a common cooling chamber, feeding cooling water to said cooling chamber, feeding overflow water from said chamber to the first distillation stage, and controlling the water feed to said first distillation stage.

9. The process of claim 8, comprising the step of feeding overflow distillate from the second distillation stage directly back to the first distillation stage.

References Cited in the file of this patent

UNITED STATES PATENTS

| 130,336 | Thompson | Aug. 6, 1872 |

FOREIGN PATENTS

| 584,578 | France | Nov. 22, 1924 |

OTHER REFERENCES

Analytical Edition, Ind. and Eng. Chem., vol. 12, No. 3, March 15, 1940, pp. 157 to 159.